United States Patent [19]

Troy

[11] 3,957,335

[45] May 18, 1976

[54] TERMINAL BLOCK ASSEMBLY

[75] Inventor: Michael K. Troy, Menlo Park, Calif.

[73] Assignee: Reliable Electric Company, Franklin Park, Ill.

[22] Filed: July 26, 1974

[21] Appl. No.: 492,057

[52] U.S. Cl. .............................. 339/125 R; 317/118; 339/198 R

[51] Int. Cl.[2] .......................... H01R 9/02; H02B 1/02

[58] Field of Search........... 339/97 P, 125 R, 198 R; 179/98; 317/118, 120, 122

[56] References Cited

UNITED STATES PATENTS

| | | | |
|---|---|---|---|
| 3,112,147 | 11/1963 | Pferd et al. | 339/97 P |
| 3,518,618 | 6/1970 | Swanson | 339/125 R |
| 3,777,223 | 12/1973 | Chandler et al. | 339/198 R X |

*Primary Examiner*—Roy Lake
*Assistant Examiner*—E. F. Desmond
*Attorney, Agent, or Firm*—Olson, Trexler, Wolters, Bushnell & Fosse, Ltd.

[57] ABSTRACT

A terminal block assembly has a dielectric body and a plurality of terminals therein. The terminals are retained by a plate that engages the body of the terminal block through a slide. Spring tabs on the plate engage recesses in the body to prevent sliding movement of the plate in one direction. A bracket for removably snap-fitting engagement with the terminal block is adapted to be mounted on a supporting surface. With the block removed, the bracket presents a channel into which a cable bundle may be positioned without obstruction. The terminal block provides a closure for the open side of the channel.

5 Claims, 5 Drawing Figures

TERMINAL BLOCK ASSEMBLY

BACKGROUND OF THE INVENTION

This invention relates to terminal block assemblies of the type used for terminating telephone lines on main distribution frames or like supporting surfaces.

The type of terminal block assembly with which the present invention is concerned is one in which the dielectric body has a plurality of terminal clips that are kept in place within the block by a retaining plate and wherein the retaining plate may be used to mount the block directly to a board, frame or like supporting surface. In other applications it is desired that the cable bundle be run under the terminal block, in which case a standoff bracket is mounted on the supporting surface and has means for removably supporting the terminal block. Standoff brackets are frequently used where the terminal blocks are arranged vertically and in line and only portions of the cable are intended to be "broken out" for terminations with terminals on the respective blocks.

In one known type of terminal block assembly the terminal plate is secured to the block through a dovetail slide, and once the plate is assembled with the terminal block body the two are held together by keys on the plate which engage recesses on the block body. It has been found, however, that in such an arrangement the interlocking of the parts is insufficient for some service applications and the retaining plate may tend to separate from the body of terminal block while being worked on by service personnel.

The standoff bracket with which the terminal block is used is of the type that utilizes a cross piece which inhibits the installation of the cable after the bracket has been mounted on the main distribution frame or other supporting surface. Thus, the foregoing arrangement requires that the cable bundle be arranged neatly and then the bracket be installed over the cable bundle.

In another form of supporting arrangement for the terminal block, U-shaped clips are attached at their bights to a specially constructed board.

OBJECTS AND SUMMARY OF THE INVENTION

An object of this invention is to provide a terminal block assembly of the general type stated which is an improvement over existing similar structures but which overcomes the foregoing difficulties.

It is a more specific object of this invention to provide a terminal block assembly of the type stated in which the retaining plate is secured in place by a rectangular slide rather than a dovetail slide as in the prior art.

A further and more specific object of this invention is to provide a terminal block assembly of the type stated in which resilient tabs are used to hold the retaining plate in its fully assembled position with the terminal block body.

A still further and important object of this invention is to provide a standoff bracket of generally U-shaped cross section that provides a channel with an opening that extends the full length of the bracket whereby the bracket can be mounted on a main distribution frame or the like and thereafter a cable bundle may be inserted within the channel with considerable ease and facility. The terminal block with assembled retaining plate can then be snap-fitted over the channel opening and thereby confine the cable bundle within the bracket.

In accordance with the foregoing objects, the present invention comprises a dielectric body having a central section and fanning strip sections at opposed margins of the central section. The central section has rows of holes with terminals therein which may be clip type terminals. The terminals are kept in place by a retaining plate whereby the wire-receiving portions of the terminals lie between the fanning strips. In order to secure the retaining plate to the body of the terminal block, there are opposed flanges on the plate overlapping ribs on the block at said opposed margins to form a slide configuration of rectangular cross-section. Spring tabs integral with the retaining plate interfit with recesses on the central section to prevent sliding movement of the retaining plate on the body in one direction. The retaining plate may be directly mounted on a supporting surface.

However, where a standoff bracket is used, the bracket has a bight and opposed legs defining a channel having an opening that is opposite to the bight and extends for the full length of the bracket whereby a cable bundle may be inserted through the opening to lie in the channel and extend throughout the full length of the channel and beyond both ends thereof. The terminal block with retaining plate can be removably snapped-fitted across the opening such that the retaining plate is presented toward the channel to confine the cable therein. The bracket and retaining plate are keyed to prevent relative movement. The bracket also has spaced pads for supporting the retaining plate and spring fingers engage lateral projections on the retaining plate to hold the plate and block assembled with the bracket.

DETAILED DESCRIPTION

Figure 1:
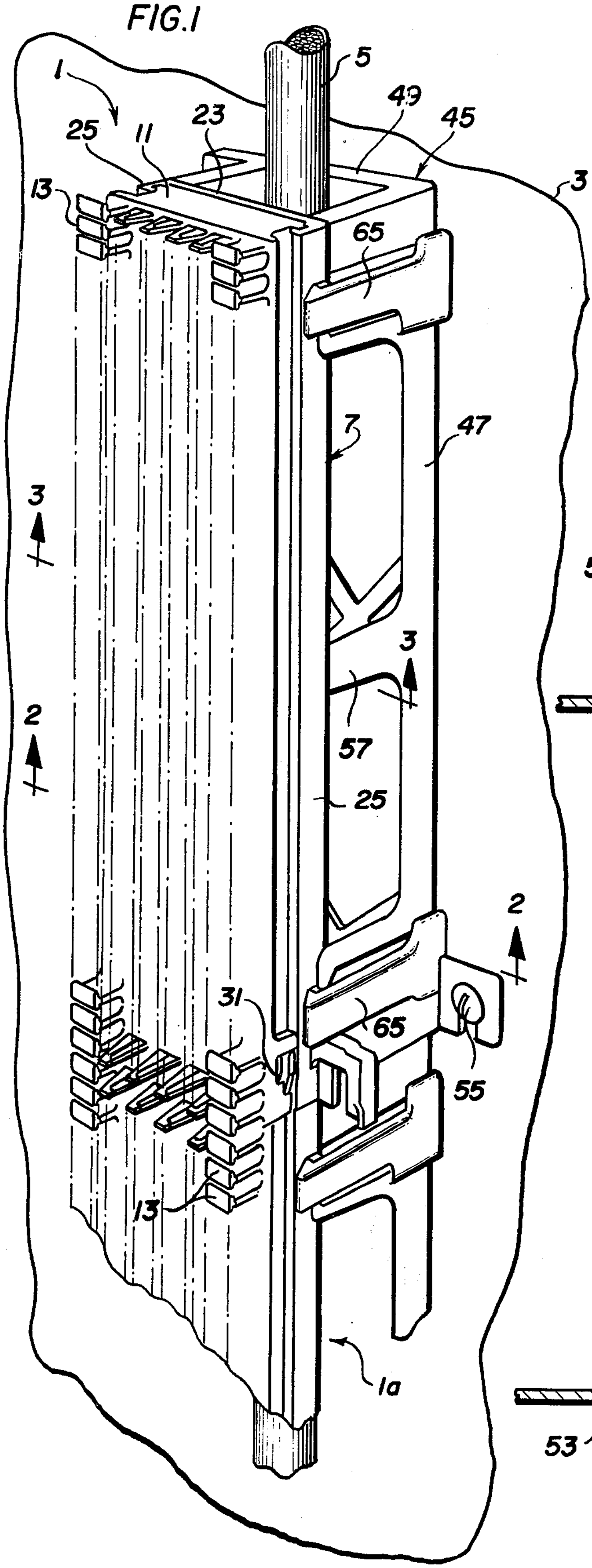
FIG. 1 is a perspective view of a terminal block assembly according to the invention.

Referring now in more detail to the drawing, which illustrates a preferred embodiment of the present invention, FIG. 1 shows a terminal block and bracket arrangement 1 that is mounted on a wall or other vertical support surface 3 for receiving a telephone cable 5. In FIG. 1 two such arrangements are shown in vertical, aligned, relationship, the lower bracket and terminal block arrangement 1*a* being shown fragmentarily, it being understood that the cable 5 passes through the assembly 1 as well as the assembly 1*a*.

The terminal block 7 comprises a dielectric body 9 having a central section 11 and fanning strips 13,13 at the opposed longitudinal margins of the central section 11. Formed in the central section 11 are a number of side-by-side rows of holes 15 which are in the form of narrow slots. The holes are disposed in the central section in a generally rectangular pattern.

Positioned somewhat loosely in each hole 15 is an electrically conductive terminal 17 of known construction. These terminals 17 include a wire-receiving portion 19 on one side of the central section 11 and a base portion 21 on the opposite side of the central section 11. The wire-receiving portions 19 are, therefore, located between the fanning strips 13,13 so that conductors from the cable 5 can be broken out from the cable passed through the fanning strips 13, and then connected to the wire-receiving portions 19, as shown, for example, in broken lines with respect to the conductor 5*a* in FIG. 2. Furthermore, the wire-receiving portion 19 is of a known type that strips the insulation from the conductor as the latter is inserted therein.

In order to keep the terminals 17 within the holes 15, a retaining plate 23 is used. This retaining plate 23 comprises longitudinal slide portions 25,25, the opposed flanges of which define a groove 27 of generally rectangular cross section. The respective grooves 27,27 receive companion shaped longitudinal ribs 29,29 which are integrally formed on the terminal block 7 adjacent to its bottom side.

The retaining plate 23 and block 7 are of the same length and are assembled by lining up the ribs 29,29 with the grooves 27,27 and then moving the block and retaining plate relatively longitudinally. This assembly procedure is carried out after the terminals 17 have been inserted into the holes 15, and preferably with the block 7 and terminals inverted from the positions shown in FIGS. 2 and 3.

Figure 5:
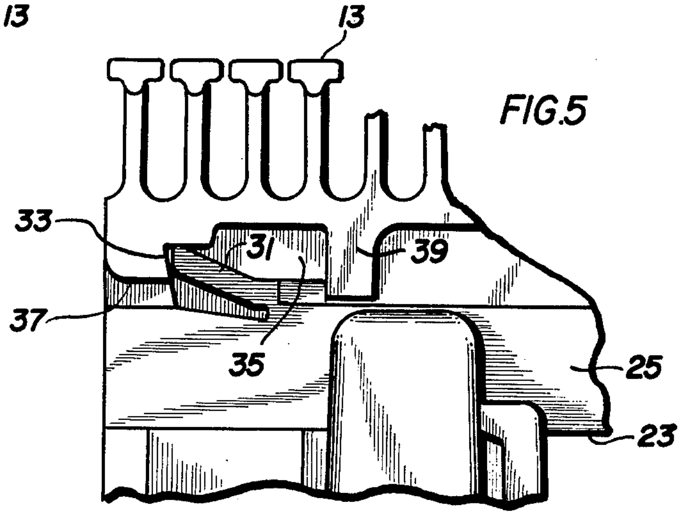
FIG. 5 is an enlarged fragmentary elevational view of a portion of FIG. 1 and showing the interlock of the retaining plate with the terminal block.

An arrangement is provided for retaining the plate 23 assembled with the block 7. Such an arrangement comprises spring tabs 31,31 integrally molded with the block 7 at the slide portions 25,25. As best seen in FIG. 5, each spring tab 31 is adapted to snap under and lock behind a shoulder 33 that is presented toward a recess 35 in the block 7. Thus, when the block and retaining plate are shifted relatively with the ribs 29 being in engagement with the grooves 27, the tabs 31 will be depressed as they ride under the edge portions 37 of the block at the shoulders 33. Thereafter, the tabs 31 snap into the recesses 35. A slight further relative movement of the block and retaining plate will cause the fixed end of each tab 33 to abut a stop 39 on the block 7. When the terminal block and retaining plate assembly is vertically mounted as shown in FIG. 1, the weight of the block 7 will actually rest on the retaining plate in that that the forces are transmitted to the plate through the stop 39. This avoids placing the weight of the terminal block on the flexible portion or tip of each spring tab 31. Also, the arrangement of the spring tabs 31 in the recesses 35 provides a substantial interference fit between the retaining plate and the terminal block in an area that is not normally susceptible to damage.

Figure 4:
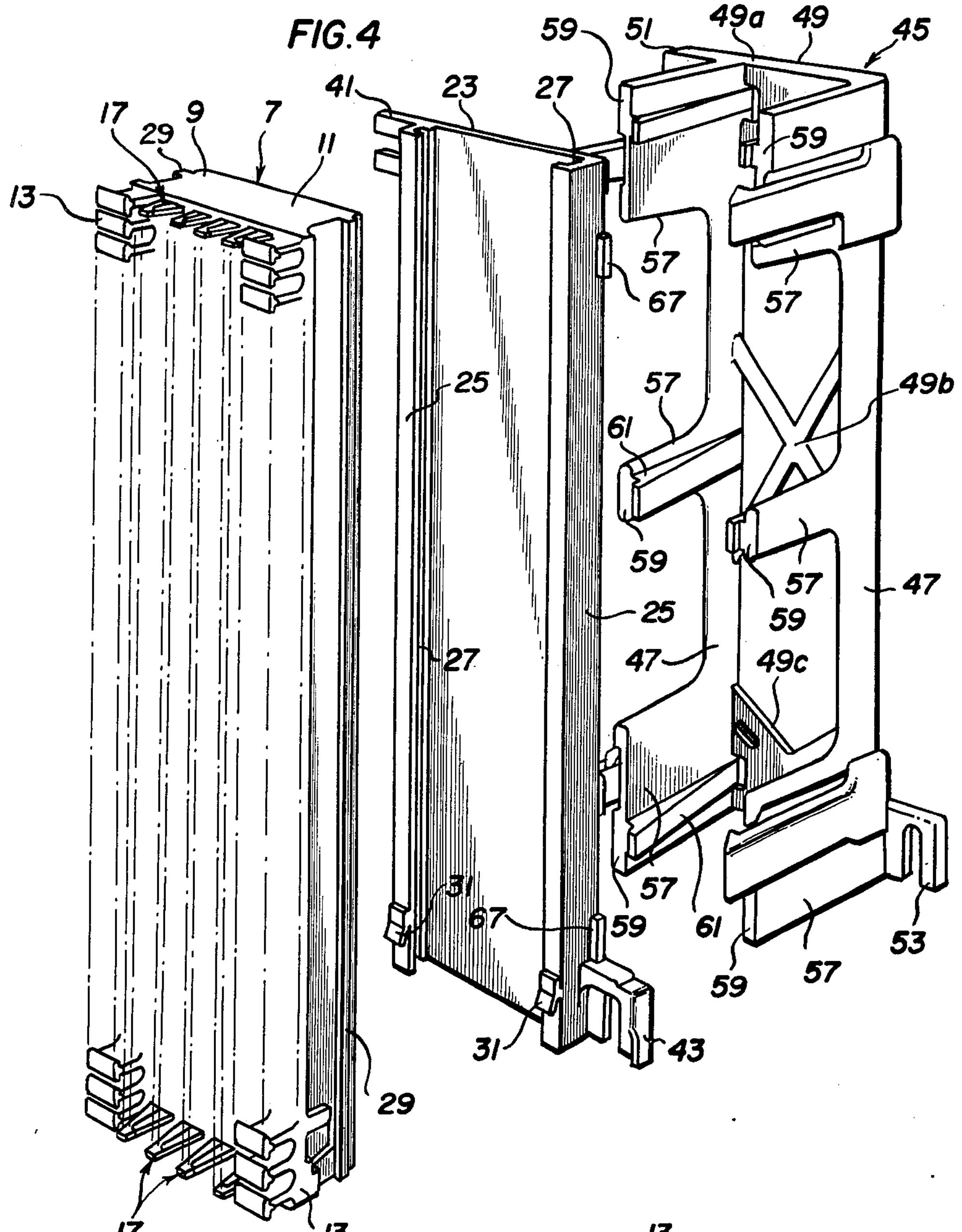
FIG. 4 is an exploded perspective view of the terminal block, retaining plate and standoff bracket.

The retaining plate 23 is also formed with top and bottom attaching ears 41,43 which are slotted to receive screws and by which the retaining plate 23 with assembled terminal block 7 may be mounted on a frame or other suitable supporting surface. However, in many instances it is desired to use a standoff bracket such as that generally designated at 45. This bracket 45 comprises opposed legs 47,47 of rather shallow depth and a bight 49. The bight 49 may simply consist of a series of section 49*a*, 49*b*, 49*c* which are spaced apart and which join the opposed legs 47,47. The bight 49 includes attaching ears 51,53 which serve the same purpose as the attaching ears 41,43. As illustrated herein, the bracket is secured to the support 3 by means of bolts 55 that pass through the slots in the attaching ears 51,53. Projecting outwardly from the legs 47,47 and forming continuations or extensions thereof are posts 57. As best seen in FIG. 4, there are three posts at each side of the bracket and with the posts at the ends of the bracket being somewhat wider than the posts centrally of the bracket. The upper or free ends of the post 57 constitute pads 59 for supporting the retaining plate 25. Furthermore, the posts 57 cooperate with the legs 47 to form spaced lateral openings through which the wires from the cable, for example the wires 5*a*, may pass outwardly and laterally of the bracket 45 for attachment to the terminals 17.

Figure 2:
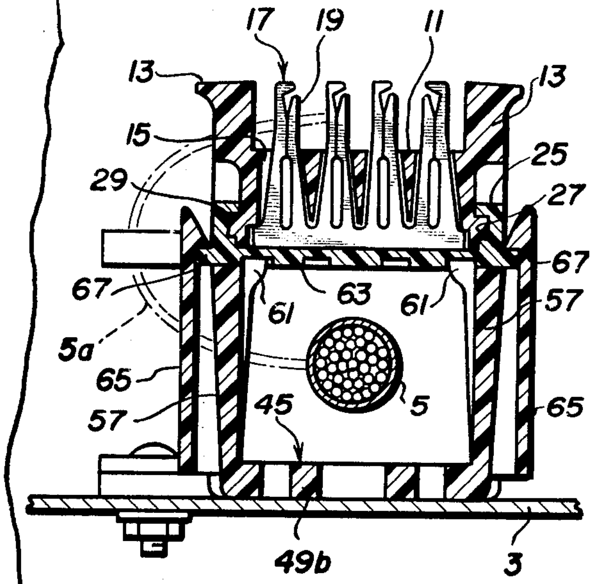
FIGS. 2 and 3 are sectional views taken along lines 2—2 and 3—3, respectively of FIG. 1.
Figure 3:
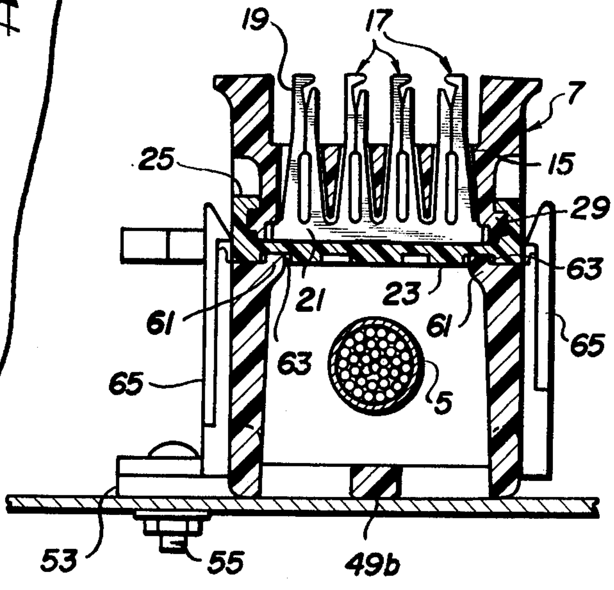

As best seen in FIGS. 2 and 3, each pad 59 includes a keying portion 61 that fits into one of the longitudinal slots or grooves 63 (FIGS. 2 and 3) on the outside surface of the retaining plate 23. The bracket 45 also integrally includes resilient fingers 65,65,65,65 that are adapted to engage lateral protuberances 67,67,67,67 at the sides of retaining plate slide portions 25,25. Thus, as the retaining plate with assembled terminal block is snapped past the inclined entrance portions of the resilient fingers 65,65,65,65, the retaining plate 23 will seat on the several pads 59 and the four resilient fingers 65 will snap over and engage the protuberances 67. This retains the assembled retaining plate and terminal block with the standoff bracket. However, before assembling the retaining plate and terminal block with the bracket 45, the cable 5 may be laid in the open channel formed by a number of such brackets vertically aligned, as indicated in FIG. 1. The installation of the assembled retaining plate and terminal block closes off the open side of the channel formed by the bracket 45 so that the cable 5 is retained in position.

The invention is claimed as follows:

1. A terminal block assembly comprising a dielectric body having a central section and fanning strip sections at opposed margins of the central section, said central section having plurality of side-by-side rows of holes, electrically conductive terminals loosely received in said holes and projecting therethrough, said terminals having wire receiving portions on one side of said central section and base portions on the opposite side of said central section and in engagement therewith, said wire receiving portions lying intermediate said fanning strip sections, a retaining plate on said central section and engaging said base portions such that said base portions are confined between said retaining plate and the parts of said central section that are engaged by said base portions, and means for securing said retaining plate to said central section; said means comprising slide portions on said retaining plate engaging ribs on said body, spring tabs integral with and cantilevered from said retaining plate and snap-fitting at their tips with recesses on said central section an amount sufficient to prevent sliding movement of the retaining plate on said body in one direction, and stops on said body adapted to engage the fixed ends of said tabs upon slight movement of the body in the opposite direction when the tabs are in said recesses.

2. A terminal block assembly according to claim 1 in which said tabs are on said slide portions.

3. A terminal block assembly according to claim 1 in combination with a bracket of generally U-shaped cross section with opposed legs and a bight, cooperating means on said bracket and terminal block assembly for removably interlocking the two to form a channel in which the bight is spaced from said retaining plate, said channel being open at its opposite ends, and means at which said bight can be secured to a supporting surface.

4. The structure of claim 3 in which said opposed legs have spaced supporting pads for said retaining plate, the spaces between said supporting pads providing lateral openings into said channel so that wires from a cable in said channel can pass outwardly through said lateral openings and through said fanning strips for connections to said terminals.

5. A terminal block and bracket arrangement comprising a dielectric body having a central section and fanning strip sections at opposed margins of the central section, said central section having a plurality of side-by-side rows of holes, electrically conductive terminals loosely received in said holes and projecting therethrough, said terminals having wire receiving portions on one side of said central section and base portions on the opposite side of said central section and in engagement therewith, said wire receiving portions lying intermediate said fanning strip sections, a retaining plate on said central section and engaging said base portions such that said base portions are confined between said retaining plate and the parts of said central section that are engaged by said base portions, and means for securing said retaining plate to said central section comprising spring tabs cantilevered from said retaining plate and engaging in recesses in said body; an elongated unitary bracket having a bight and opposed legs defining a channel having an opening that is opposite to said bight and extends for the full length of said bracket, means at which the bracket may be mounted on a supporting surface with the bight thereagainst so that said channel opening is presented away from the supporting surface whereby a cable may be inserted through said opening to lie in said channel and extend throughout the full length of the channel when the bracket is mounted as aforesaid on said supporting surface, and means for removably mounting the assembled body and retaining plate on said bracket across said opening such that the retaining plate is presented toward said channel.

* * * * *